(No Model.)
M. RENSHAW.
HORSE CLEANER.
No. 439,561.  Patented Oct. 28, 1890.
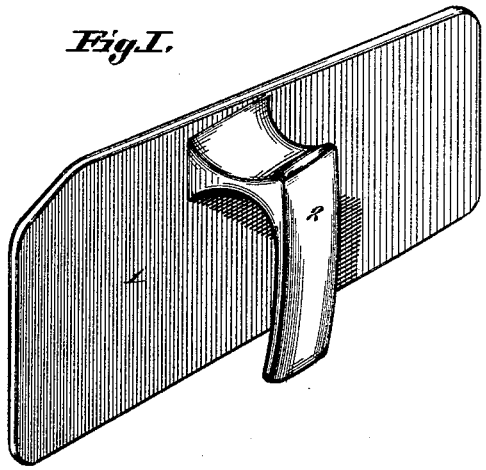
Fig. I.
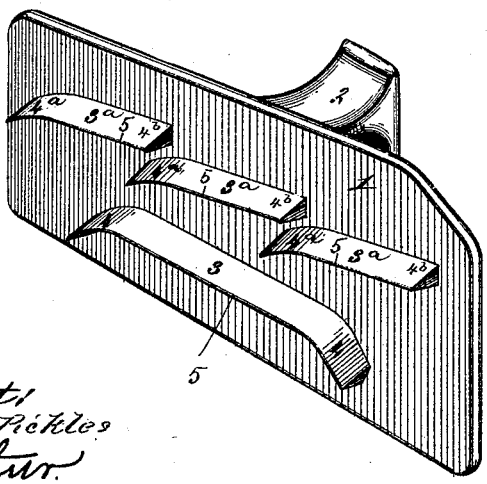
Fig. II.
Attest:
Charles Pickles
E. Arthur
Inventor:
Morrison Renshaw
By Knight Bros
Attys

UNITED STATES PATENT OFFICE.

MORRISON RENSHAW, OF ST. LOUIS, MISSOURI, ASSIGNOR TO THE SWIFT-RENSHAW MANUFACTURING COMPANY, OF SAME PLACE.

HORSE-CLEANER.

SPECIFICATION forming part of Letters Patent No. 439,561, dated October 28, 1890.

Application filed March 30, 1889. Serial No. 305,359. (No model.)

*To all whom it may concern:*

Be it known that I, MORRISON RENSHAW, of the city of St. Louis, in the State of Missouri, have invented a certain new and useful Improvement in Horse-Cleaners, of which the following is a full, clear, and exact description, reference being had to the accompanying drawings, forming part of this specification, and in which—

Figure I is a perspective view looking at the back of my improved cleaner. Fig. II is a similar view looking at the face of the cleaner.

My invention relates to an improved device for cleaning animals, and is of the general character of a curry-comb; and my invention consists in features of novelty hereinafter fully described, and pointed out in the claims.

Referring to the drawings, 1 represents a plate provided on the back with a suitable handle 2. On the face of the plate there are a number of ribs or flanges 3 3$^a$, having plain scraping-edges 5. The lower rib 3 is preferably provided with a curve 4 at each end, and the upper ribs 3$^a$ are preferably provided with a curve 4$^a$ at one end only, and these ribs are placed in a slightly diagonal direction across the plate. These upper ribs 3$^a$ are hereinafter referred to as a "series." The end 4$^a$ of one of the series of ribs preferably extends beyond and beneath the other end 4$^b$ of its adjoining or adjacent rib, so that these ribs form steps. By thus arranging the series of ribs they form a continuous ridge from end to end of the plate, and their curved ends and diagonal position present a shearing action, which moves the dust and dirt on the animal backward on the cleaner, and the lower rib 3 serves to remove any dust that may be missed by the upper row of ribs. This lower rib is also useful in removing perspiration from the animal.

The device might be modified by omitting the lower rib 3 and also by omitting the handle 2 and a somewhat satisfactory instrument produced.

I claim as my invention—

1. A horse-cleaning device comprising a plate having a series of cleaning-ribs formed with plain scraping-edges and arranged in steps in diagonal position thereon, substantially as described.

2. A horse-cleaning device comprising a plate, a series of cleaning-ribs formed with plain scraping-edges and arranged in steps in diagonal position thereon, and a cleaning-rib having a plain scraping-edge and extending beneath the series of cleaning-ribs, substantially as described.

3. A horse-cleaning device comprising a plate, a series of cleaning-ribs arranged in steps having overlapping curved ends, and a rib extending beneath the series of cleaning-ribs having curved ends, substantially as described.

4. A horse-cleaning device comprising a plate, a series of cleaning-ribs having overlapping curved ends and arranged in diagonal position, and a rib extending beneath the series of cleaning-ribs having curved ends, substantially as described.

MORRISON RENSHAW.

In presence of—
EDW. S. KNIGHT,
THOS. KNIGHT.